(12) United States Patent
Chopra et al.

(10) Patent No.: US 7,747,971 B1
(45) Date of Patent: Jun. 29, 2010

(54) STATE RETENTION FOR FORMAL VERIFICATION

(75) Inventors: Manu Chopra, New Delhi (IN); Alok Jain, New Delhi (IN); Erich Marschner, Ellicott City, MD (US)

(73) Assignee: Cadence Design Systems, Inc., San Jose, CA (US)

( * ) Notice: Subject to any disclaimer, the term of this patent is extended or adjusted under 35 U.S.C. 154(b) by 369 days.

(21) Appl. No.: 11/772,118

(22) Filed: Jun. 30, 2007

(51) Int. Cl.
*G06F 17/50* (2006.01)
(52) U.S. Cl. .............................................. 716/4; 716/2
(58) Field of Classification Search ................ 716/1–2, 716/4
See application file for complete search history.

(56) References Cited

U.S. PATENT DOCUMENTS

| | | | |
|---|---|---|---|
| 6,779,163 B2 | 8/2004 | Bednar et al. | |
| 6,820,240 B2 | 11/2004 | Bednar et al. | |
| 6,883,152 B2 | 4/2005 | Bednar et al. | |
| 7,131,099 B2* | 10/2006 | Schuppe ....................... | 716/18 |
| 7,356,786 B2* | 4/2008 | Schubert et al. ............... | 716/4 |
| 7,478,028 B2* | 1/2009 | Ho et al. ....................... | 703/14 |
| 7,487,483 B2* | 2/2009 | Seawright et al. .............. | 716/6 |
| 2006/0129954 A1* | 6/2006 | Schuppe ........................ | 716/4 |
| 2007/0245277 A1* | 10/2007 | Chen ............................. | 716/5 |
| 2007/0245285 A1* | 10/2007 | Wang et al. .................... | 716/10 |
| 2007/0271536 A1* | 11/2007 | Seawright et al. ............. | 716/5 |
| 2009/0144684 A1* | 6/2009 | Seawright et al. ............. | 716/6 |

* cited by examiner

*Primary Examiner*—Stacy A Whitmore
(74) *Attorney, Agent, or Firm*—Stephen C. Durant (57) ABSTRACT

Verification model of static state retention behavior of a state saving element design during power shut off of the state saving element in an integrated circuit design including: creating in a computer readable medium a model of a single edge triggered state saving element; and creating in the computer readable medium clock gate logic that suspends saving of new states by the single state saving element upon the occurrence of a first state retention signal in preparation for power shut off.

8 Claims, 8 Drawing Sheets

Power domain on when PWR is high

Always On Power Domain

PRIOR ART

Figure 8

PRIOR ART

FIG. 9

STATE RETENTION FOR FORMAL VERIFICATION

BACKGROUND OF THE INVENTION

1. Field of the Invention

The invention relates in general to designing of integrated circuits, and more particularly, to formal verification of low power integrated circuit designs.

2. Description of the Related Art

There is a growing need for enhanced power management capability in electronic devices, especially in battery-operated portable wireless devices such as cell phones, for example. Power management typically involves minimizing overall power consumption among different device functions. The intricacies of power management increase with the number and complexity of device functions.

Power management capabilities typically are built into a circuit design. Techniques to design-in power consumption management in an integrated circuit (IC) design include minimization of leakage power dissipation, design of efficient packaging and cooling systems and verification of functionality or power shut-off sequences early in the IC design process. For example, an integrated circuit can be partitioned into power domains, each of which contains circuit elements with similar power-related attributes, so that the power to each domain can be managed separately. Power management techniques that can be applied to power domains include the ability to power-up or power-down the circuit design blocks within a particular power domain as a group and the ability to a specify a particular voltage level for circuit design blocks within a power domain. Also, clock gating can be employed to save power by selectively turning off the clock signal controlling state elements that are not being used for a period of time.

In some designs, all the design blocks of a given power domain are switched on or off simultaneously. Modern hardware designs, which have very stringent power requirements, may have multiple power domains, so that parts of the design can be switched off when required to save power. A power domain may be switched on, later, when so required. Further, for some applications it is required that a power domain must come back up in same state as when it was powered down. Such capability typically is modeled using state retention elements in the design.

State retention elements, at the physical level, can be implemented in various different ways. For example, state may be retained by copying the state of state retention elements to other flip-flops or latches, which belong to a power domain that remains powered up when the power domain for which state is retained is powered off. Alternatively, state of state retention elements may be retained by copying the state of system to secondary memory. As yet another alternative, state may be copied to system memory by software.

The above approaches each involve creation of at least one additional state bit per state element whose state is to be retained. The additional state bit is used to save system state when the corresponding power domain is switched off. This might be the desirable solution for implementation flow and workable technique for verification of such circuits using simulation. However, creation of an additional state retention bit can severely impact Formal Verification of such designs.

Formal Verification is known to have complexity which is roughly exponential to the number of state bits in the circuit model. That is, every additional state retention bit approximately could double the complexity for formal verification.

Formal verification is a method of determining whether a design functions in a manner that satisfies its specification. Formal verification is distinguished from other functional verification methods, such as simulation, in that it typically considers all possible behaviors of the design for a given set of input constraints, rather than just considering one possible behavior at a time. This characteristic makes formal verification results much more comprehensive than typical simulation results. At the same time, this characteristic makes formal verification sensitive to the size of the state space of a design, which is a function of the number of state bits involved in the design.

Assertion-based verification captures the behavior required by a design's specification in the form of declarative statements called assertions. Functional verification tools (both simulation and formal verification) can then focus on determining whether a given assertion "holds" for a given design, i.e., whether the design satisfies the assertion by always behaving in a manner that is consistent with the assertion.

Assertion-based formal verification involves proving that assertions hold for all possible states of the design. The possible states are those that are reachable from the design's initial state, given a particular set of input constraints. Assertions can describe required behavior of a design independent of any power control activity, or they can describe behavior specific to the operation of power control circuitry.

In both cases, the ability to formally verify that the design is behaving in a manner that is consistent with its assertions depends upon having an accurate and efficient model representing the addition of power control circuitry to the design. Thus, there has been a need for an accurate and efficient model, that accurately models the effects of power shutoff when applied to state elements, and that models these effects without adding additional state bits to the verification model that could exponentially increase the design's state space. The present invention meets this need.

BRIEF DESCRIPTION OF THE DRAWINGS

The aforementioned features and advantages of the invention, as well as additional features and advantages thereof, will be more clearly understandable after reading detailed descriptions of embodiments of the invention in conjunction with the following drawings.

DETAILED DESCRIPTION OF THE PREFERRED EMBODIMENTS

The following description is presented to enable any person skilled in the art to make and use a method and apparatus for assertion based verification of electronic circuit designs having state retention elements, in accordance with embodiments of the invention, and is provided in the context of particular applications and their requirements. Various modifications to the preferred embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and processes are shown in block diagram form in order not to obscure the description of the invention with unnecessary detail. Thus, the present invention is not intended to be limited to the embodiments shown, but is to be accorded the widest scope consistent with the principles and features disclosed herein.

Typically, high-level hardware design language (HDL) is used to express a register transfer level (RTL) description of a design that describes a circuit in terms of a sequence of transfers of data. The word 'register' refers to the fact that in a circuit undergoing design, such transfers ultimately will occur between storage elements such as registers, for example. VHDL and Verilog, are examples of some of the more popular HDLs. An RTL description, for instance, may describe a circuit as a collection of registers, Boolean equations, control logic such as "if-then-else" statements as well as complex event sequences. An RTL description may describe functionality of a set of interconnected modules of varied complexity, from simple logic gates to full blown multipliers, for example. Moreover, a logic gate abstraction level description sometimes is included as part of an RTL specification, for IP blocks, for example. An RTL specification provides instructions to EDA systems, for example, to produce a gate-level netlist and then, through additional design implementation stages, a physical design.

Formal verification ordinarily involves several processing stages. The design code (in Verilog or VHDL) describing elements of the design, including any associated assertions, is first read in, checked for errors, and converted to an internal representation of the source text. Next, the design element representations are assembled into a complete design, in which each element may be duplicated multiple times, and the instances of each element are composed hierarchically. During this stage, power control information is incorporated into the hierarchical design structure.

After that, the hierarchical design is converted into a representation that reflects the control and data flow occurring in the design. Next, the control and data flow information is converted to a logical netlist representation designed to efficiently support formal verification. Power control information, including state retention information, is applied during this conversion process.

For each assertion to be verified, the relevant portion of the design is identified, and constraints on the inputs to that portion of the design are identified. Finally, one or more formal verification engines operate on the design data with its input constraints, to determine whether a contradiction can be found between the behavior of the design and the behavior described by the assertion. If no contradiction can be found, the assertion is considered proven.

Figure 1:
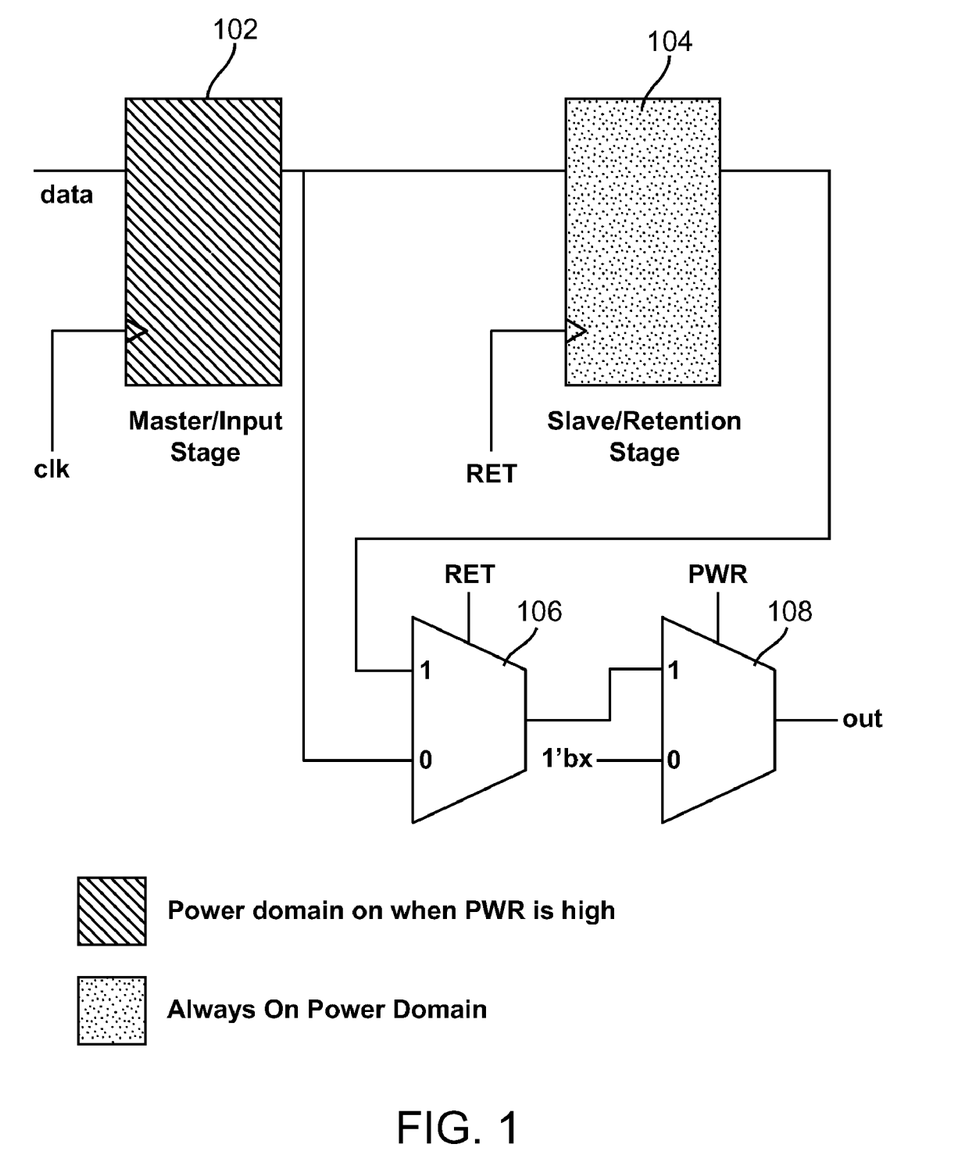
FIG. 1 is an illustrative block diagram of an abstract model of a state retention circuit.

FIG. 1 is an illustrative block diagram of an abstract model of a state retention circuit 100. The model of FIG. 1 includes a first state retention element 102 and a second state retention element 104 and a first multiplex circuit 106 and a second multiplex circuit 108. In the illustrated circuit, the first and second state retention elements 102, 104, comprise synchronous D Flip Flops (DFFs) that are triggered to store data upon occurrence of rising signal edges provided to their respective clock inputs. Power to the first DFF 102 can be turned off through operation of a power control signal (PWR) that controls provision of power from the first power source to the first DFF 102. During operation, power is supplied to both the first and second DFFs 102, 104. During shutdown of power to the first DFF 102, power still is provided to the second DFF 104, which remains operative while the first DFF 102 is shut off.

The first DFF 102 includes an input line coupled to receive a data signal (d), an output line and a clock input line coupled to receive a clock signal (elk). The second DFF 104 includes an input line coupled to the output line of the first DFF 102 and includes an output line and includes a clock input line coupled to receive a state retention control signal (RET).

The first multiplexer 106 includes a first input line coupled to the output line of the second DFF 104 and includes a second input line coupled to the output line of the first DFF 102. The first multiplexer 106 also includes an output line coupled to a first input line of the second multiplexer 108. The first multiplexer 106 includes a control line that receives the retention control signal RET, which controls selection between a signal on its first input line and a signal on its second input line for provision as an output signal on its output line. Specifically, a control line of the first multiplexer 106 selects the signal on its first input line when RET=1 and selects the signal on its second input line when RET=0, for provision as an output signal on its output line.

The second multiplexer 108 includes the first input line coupled to the output line of the first multiplexer 106 and includes a second input line coupled to receive an x-value signal (1'bx) that indicates an indefinite or unreliable state. (The symbol 1'bx is a Verilog notation indicating a binary value of "x", which is indeterminate, i.e. it could be either logic level=1 or logic level=0) Note that in an actual hardware implementation of the abstract state retention circuit model 100, the unreliable state would result from the shut off of power, and there would be no need to generate an unknown value, i.e. 1'bx. The reason that we are using an X value during power down is that we want to use a pessimistic model that will catch any downstream bugs. So, if our X propagates and corrupts some of the downstream logic, then we know there is some sort of a functionality bug during power down. The second multiplexer 108 includes an output line that provides an output signal (OUT). The second multiplexer 108 includes a control line that receives power control signal (PWR), which controls selection between a signal on its first input line and a signal on its second input line for provision as an output signal (OUT) on its output line. In particular, a control line of the second multiplexer 108 selects the signal on its first input line when PWR=1 and selects the signal on its second input line when PWR=0, for provision as an output signal on its output line.

Figure 2:
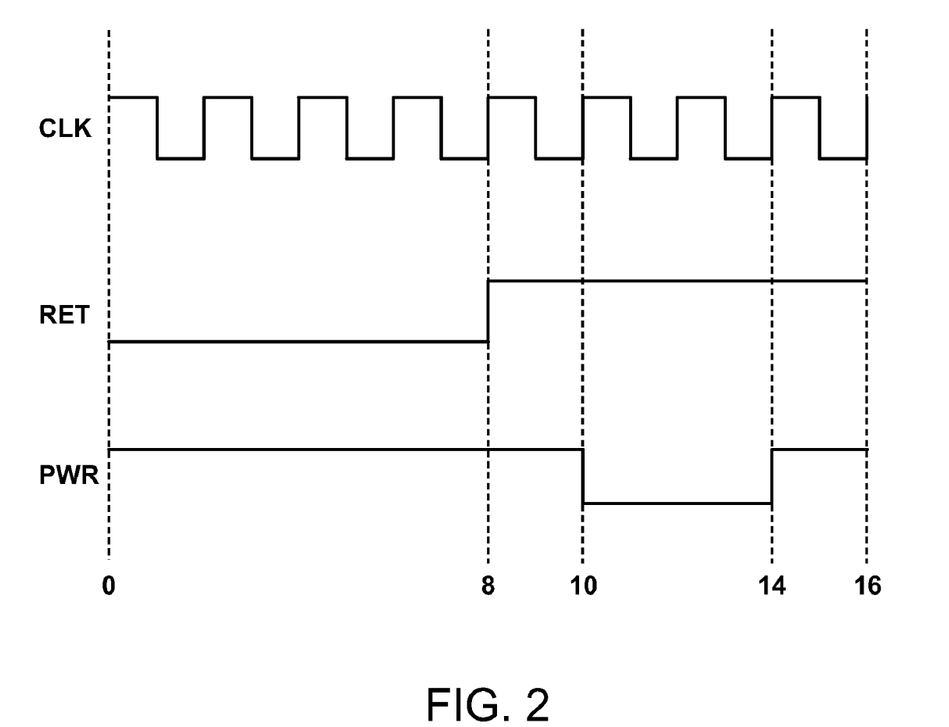
FIG. 2 is an illustrative timing diagram to explain the operation of the abstract state retention circuit model of FIG. 1.

FIG. 2 is an illustrative timing diagram to explain the operation of the abstract state retention circuit model of FIG. 1. The second DFF 104 is presumed to be always powered-up during operation of the first DFF 102. During power-on operation with power to the first DFF 102 turned on, the first DFF 102 retains the value of a data signal (d) provided on its input line upon the occurrence of a rising clock edge (clk) on its clock input line. It will be appreciated that the value of the data signal (d) may change frequently. Hence, the value saved in the first DFF 102 can change frequently during powered-up operation.

At time t=0, with RET=0 and PWR=1 the state retention circuit 100 operates in a powered-up mode of operation. The value PWR=1 indicates that the first DFF 102 is coupled to receive power from the first power source. The first DFF 102 retains the value of a data signal (d) provided on its input line upon the occurrence of a rising clock edge clock (clk) on its clock input line. The signal value RET=0 causes the first multiplexer 106 to couple the signal on its second input line to its output line. Specifically, with RET=0, the first multiplexer 106 couples an output signal provided on the output line of the first DFF 102 to the output line of the first multiplexer 106. The signal value PWR=1 causes the second multiplexer 108 to couple the signal on its first input line to its output line. Specifically, with PWR=1, the second multiplexer 108 couples an output signal provided on the output line of the first multiplexer 106 to the output line of the second multiplexer 108. Thus, at t=0, the first DFF 102 is powered up and an output signal of the first DFF 102 is provided as the output signal (OUT) from the second multiplexer 108. Although the second DFF 104 is presumed to be always operative during power-on (and power-off) operation of the first DFF 102, since RET=0 is provided to the clock input line of the second DFF 104, the second DFF 104 does not save new values output by the first DFF 102.

At time t=8, PWR=1 and RET transitions from RET=0 to RET=1. The rising edge RET=1 signal causes the second DFF 104 to save the current value saved (and output) by the first DFF 102. Although the first DFF 102 is powered-up, the RET=1 signal causes the second multiplexer 106 to select the output of the second DFF 104 for provision to its output.

Specifically, at t=8, the RET signal is provided to the clock input of the DFF 104, and the rising edge transition of the signal RET to RET=1 causes the second DFF 104 to store the signal provided on its input line. Specifically, when signal RET transitions from RET=0 to RET=1, the second DFF 104 stores the signal value output by the first DFF 102 at the time of the transition. With RET=1, the first multiplexer 106 couples an output signal provided on the output line of the second DFF 104 to the output line of the first multiplexer 106. Also, with PWR=1 the second multiplexer 108 couples the signal on its first input line to its output line. Specifically, with PWR=1, the second multiplexer 108 couples the output of the second DFF 104, passed along by the first multiplexer 106, to its output line as the output signal (OUT). Thus, at t=8, before the first DFF 102 is powered off, the second DFF 104 saves the value presently saved by and output by the first DFF 102. That value saved by the second DFF 104 is provided as the output signal (OUT) from the second multiplexer 108.

At time t=10, RET=1 and PWR transitions from PWR=1 to PWR=0. The transition of the PWR signal to PWR=0 indicates that the first DFF 102 has had its power shut off. The PWR=0 value causes the second multiplexer 108 to select a signal value (1'bx) which indicates that the value of the output signal (OUT) is uncertain or indeterminate.

In particular, the transition of the signal PWR to PWR=0 causes the second multiplexer 106 to select the value 1'bx signal on its second input line. Thus, upon occurrence of a power shut-off, which shuts off power to the first DFF 102, the value of a signal (OUT) on the output line of the second multiplexer 108 has a value defined as uncertain. Recall that the second DFF 104 inputted and saved the value that had been saved by the first DFF 102 at time t=8, just prior to power shut-off of the first DFF 102, when DFF transitioned to DFF=1. During power shut-off of the first DFF 102, which commences with the PWR signal transitioning to PWR=0, the second DFF 104 continues to save that same value previously saved by the first DFF 102 just prior to its power shut off.

During the time interval between t=10 and t=9, the first DFF 102 is in a power-off mode. The second DFF 104 is powered-on and saves the state that had been saved in the first DFF 102 just prior to shut-off of the first DFF 102. The value of the output signal (OUT) is defined as 'x', indeterminate.

At time t=9, RET=1, and PWR transitions from PWR=0 to PWR=1. The transition of the signal PWR to PWR=1 indicates that the first DFF 102 has its power turned on again. The PWR=1 value causes the second multiplexer 108 to select a signal output by the second DFF 104 which is provided on the second input line of the second multiplexer 108 for provision as its output signal (OUT). Thus, during a time following power-on of the first DFF 102, the value saved by the second DFF 104 is provided as the output signal (OUT).

Specifically, the transition of the signal PWR to PWR=1 causes the second multiplexer 106 to select the signal on its first input which represents the value stored by the second DFF 104 during power shut off. Recall that the second DFF 104 stores the value stored by the first DFF 102 prior to power shut off. Thus, when the power to the first DFF 102 is initially turned back on, the output line (OUT) of the second multiplexer 108 provides a signal having the value saved by the second DFF 104 from the first DFF 102 just prior to power shut off of the first DFF 102.

At time t=16, PWR=1, and RET transitions from RET=1 to RET=0. The transition of the signal RET back to RET=0 returns the circuit 100 to the powered-up mode that it was in at t=0, prior to the power shut off. The transition of the signal RET to RET=0 causes the first multiplexer 106 to select the signal on its second input which represents the value stored by the first DFF 102. With RET=0 and PWR=1, the value output by the first DFF 102 is passed by the first and second multiplexers 106, 108 and is provided as the output signal (OUT). It will be appreciated that the falling edge of the RET signal provided to the clock input line of the second DFF 104 puts the RET signal back into a state in which it is ready to later undertake a rising edge transition from RET=0 to RET=1 to cause the second DFF 104 to save a value from the first DFF 102 just prior to a next power shut off of the first DFF 102.

Figure 3:
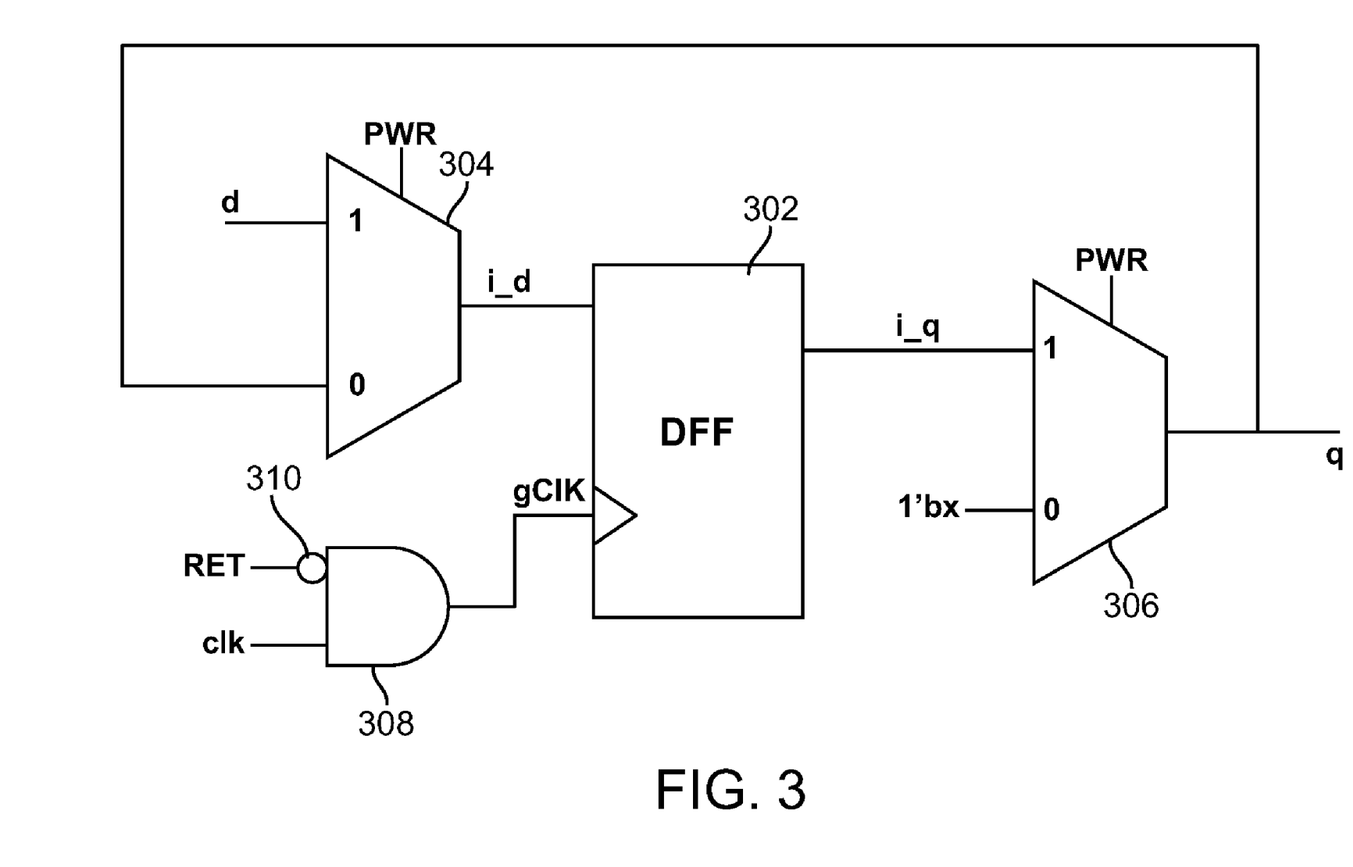
FIG. 3 is an illustrative block diagram of a synchronous first verification model representing behavior of the abstract state retention circuit model of FIG. 1 used during formal verification in accordance with some embodiments of the invention.

FIG. 3 is an illustrative block diagram of a synchronous first verification model 300 representing behavior of the abstract state retention circuit model 100 of FIG. 1 used during formal verification in accordance with some embodiments of the invention. Table 1 provides a Verilg description of the first model 300.

TABLE 1

```
reg i_q;
wire i_d;
assign i_d = (PWR ? d : q);
wire gClk;
assign gClk = clk & !RET;
always @(posedge gClk)
    i_q <= i_d;
assign q = PWR ? i_q : 1 'bx;
```

The first model 300 includes a clock edge triggered DFF 302, first multiplexer 304, a second multiplexer 306, an AND logic gate 308 including an inverting input 310. The AND gate 308 with the inverting input 310 act as a clock gating circuit. The operation of the first model will be explained with reference to the illustrative timing diagram of FIG. 2.

Behavior of the first model 300 of FIG. 3 at time t=0, PWR=1 and RET=0, represents powered-up behaviors the first and second DFFs 102, 104 of FIG. 1. With PWR=1, both the first and second multiplexers 304, 306 select signals on their respective first input lines. The first multiplexer 304 provides a value of a data signal (d) on its first input line as the value of an output signal i_d on its output line. The second multiplexer 306 provides a value of an i_q on its first input line as an output value (q) on its output line. Since RET=0, the RET signal provided to the inverting input 310 of the AND gate 308 causes the gated clock signal (gClk) to follow or mirror the clock signal (clk) provided to the other (non-inverted) input to the AND gate 308. It will be appreciated that since the AND gate will always have some small, finite delay, the output signal gClk will follow or reflect the input signal clk, but it will be delayed in time by at least a little. Thus, for each transition on clk, there will be a corresponding transition on gCLK, in the same order, and with the same relative timing, but the two signals displayed side by side in a time-oriented waveform display typically would not match exactly.

Accordingly, during powered-on operation represented by the signal PWR and RET signal values at time t=0, the value of a data signal (d) on the first input line of the first multiplexer 304 is passed by the first multiplexer 304 to its output as the i_d input of the DFF 302. At each rising edge tick of the gated clock signal (gClk), the first DFF 302 saves the i_d signal value (d) provided at that moment and provides the presently saved signal value as its i_q output value. The second multiplexer 306 passes the i_q value on its first input line to its output line as the output signal value (q).

Behavior of the first model 300 at time t=8, when RET transitions from RET=0 to RET=1 and PWR=1 represents behavior of the first DFF 102 and the second DFF 104 of FIG. 1 in the course of saving the state of the first DFF 102 to the second DFF 104 just before power shut off of the first DFF 103. The provision of RET=1 to the inverting input of the AND gate 308 blocks the gated clock signal (gClk) and causes the clock input to remain at logic level=0. As a result, the DFF 302 cannot input updated i_d values. Accordingly, the value stored in the DFF 302 at the moment that RET transitions to RET=1 is retained in the DFF 302. With PWR=1, the second multiplexer 306 selects the i_q value on its first input line for provision as the (q) value on its output line, and the first multiplexer 304 selects the data signal value (d) on its first output for provision as the i_d value on its output line. However, since the transition of the RET signal to RET=1 prevents the clock signal (gClk) from triggering the DFF 302, the value stored in the DFF 302 at the moment when RET transitions to RET=1 remains stored in the DFF 302 regardless of signal values output by the first and second multiplexers 304, 306.

Behavior of the first model 300 at time t=10, when RET=1, and PWR transitions from PWR=1 to PWR=0 represents behavior of the first and second DFFs 102, 104 of FIG. 1 during power shut off of the first DFF 102 while the second DFF 104 saves the state that was in the first DFF 102 when RET transitioned to RET=1. With RET=1, the DFF 302 continues to store the value stored in the DFF 302 at t=8, when RET transitioned to RET=1. With PWR=0, the first multiplexer 304 selects the output value (q) on its second input line for provision as the i_d value on its output line. Note that the output line of the second multiplexer 306 feeds its output back to the second input of the first multiplexer 304. Also, with PWR=0, the second multiplexer 306 selects the value 1'bx on its second input line for provision as the (q) value on its output line. Therefore, during power shut off, which begins at t=10, both the output value (q) and the value of the input to the DFF 302 are indeterminate (1'bx), although the DFF 302 continues to store the data value (d) stored in the DFF at t=8, the moment the RET signal transitioned to RET=1.

Behavior of the first model 300 at t=9, when PWR transitions from PWR=0 to PWR=1, and RET=1 represents behaviors of the first and second DFFs 102, 104 of FIG. 1 in retrieving from the second DFF 104 the state saved state at t=8. With RET=1, the gated clock signal (gClk) remains blocked, and the DFF 302 continues to store the value saved in the DFF 302 at t=8, when RET transitioned to RET=1. With PWR=1, the first multiplexer 304 selects the value (d) on its first input line for provision as the i_d value on its output line. Also, with PWR=1, the second multiplexer 306 selects the value i_q on its first input line for provision as the output signal (q) value on its output line. The value i_q is the value that was saved in the DFF 302 at t=8, when RET transitioned to RET=1.

Behavior of the first model 300 at t=16, when RET transitions from RET=1 to RET=0, and PWR=1 represents behaviors of the first and second DFFs 102, 104 of FIG. 1 when the first DFF 102 returns to operation in a powered-on state. With PWR=1, the first multiplexer 304 selects the value (d) on its first input line for provision as the i_d value on its output line. Also, with PWR=1, and the second multiplexer 306 selects the value i_q on its first input line for provision as the (q) value on its output line.

With RET=0, the RET signal provided to the inverting input 310 of the AND gate 308 causes the gated clock signal (gClk) signal to follow the clock signal (elk) provided to the other (non-inverted) input to the AND gate. Accordingly, at t=16, the synchronous model 300 has returned to the same powered up operation as at t=0.

Figure 4:
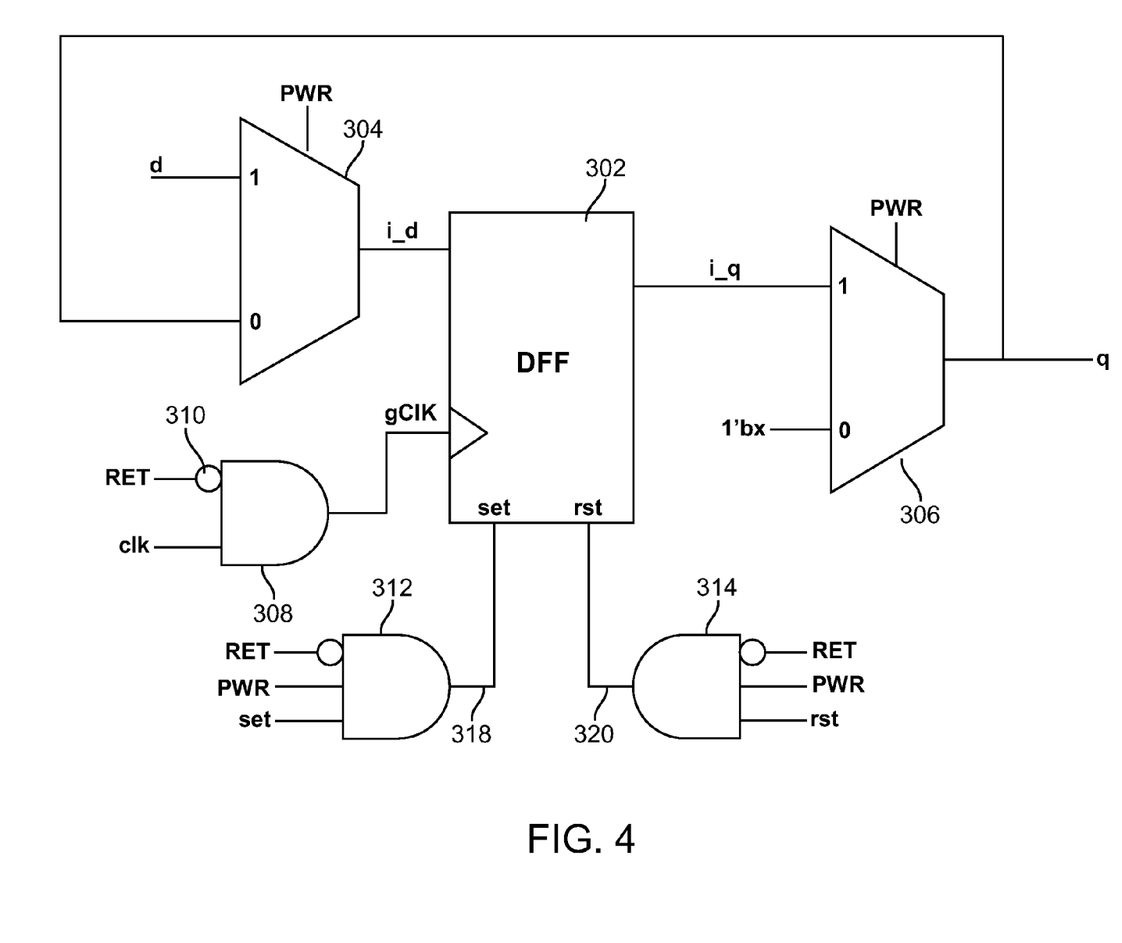
FIG. 4 is an illustrative block diagram of a synchronous second verification model representing behavior of the abstract state retention circuit model of FIG. 1, including asynchronous set and reset inputs, used during formal verification in accordance with some embodiments of the invention.

FIG. 4 is an illustrative block diagram of a synchronous second verification model 300' representing behavior of the abstract state retention circuit model 100 of FIG. 1, including asynchronous set and reset inputs, used during formal verification in accordance with some embodiments of the invention. Table 2 is a Verilog representation of the second model 300'.

TABLE 2

```
wire i_set, i_rst;
assign i_set = set & PWR & !RET;
assign i_rst = rst & PWR & !RET;
reg i_q;
wire i_d;
assign i_d = (PWR ? d : q);
```

TABLE 2-continued

```
wire gClk;
assign gClk = clk & !RLT;
always @(posedge gClk or posedge i_set
or posedge i_rst) begin
    if (i_rst) i_q <= 1 'b0;
    else if (i_set) i_q <= 1 'b1;
    else i_q <= i_d;
end
assign q = PWR ? i_q : 1 'bx;
```

The second model 300' is identical to that of the first model illustrated with reference to FIG. 3, except for the inclusion of a set terminal 318 and a corresponding set-control AND logic gate 39 to control a DFF 'set' function, and the inclusion of a reset terminal 320 and a corresponding reset AND logic gate 316 to control a DFF 'reset' function. Components of the first model 300 that are identical to corresponding components of the second model 300' are identified with identical reference numerals.

Operation of the second model 300' is identical to that of the first model 300 except for behaviors relating to the set and reset control functions. The set control AND gate 312 provides an 'active' output control (logic level=1) signal to the set terminal 318 of the DFF only if set=1; PWR=1; and RET=0. Similarly, reset control AND gate 39 provides an 'active' output control (logic level=1) signal to the reset terminal 320 of the DFF 302 only if reset=1; PWR=1; and RET=0. In this example, the reset input is assumed to take precedence over the set input, which takes precedence over the data input. Thus, referring to FIG. 3, since RET=1 throughout the time interval beginning with t=8 and ending with t=16 a value stored in the DFF 302 during that time interval will not be influenced by changes to the set signal value applied to the set-control AND gate 312. Similarly, throughout the time interval beginning with t=8 and ending with t=16 a value stored in the DFF 302 during that time interval will not be influenced by changes to the reset signal value applied to the reset-control AND gate 39.

Provision of the 1'bx value ensures that the output value (q) transitions to transitions to an unknown or indeterminate value (i.e., 1'bx) when the power is shut off. This supports verification by ensuring that downstream logic elements do not try to consume the output of this state element (DFF 302) when it is in power off mode. Since the corrupted value 1'bx represents either or both 0 and 1, downstream computations depending on output of DFF 302 will very likely produce incorrect results if they are performed when this state element is powered off.

Also, provision of the 1'bx value ensures that the state element, DFF 302, itself will be corrupted (replaced by 1'bx) if the state retention signal RET is not asserted before the power is shut off. This supports verification that the control signals are being manipulated correctly. In particular, if the RET signal is not asserted (RET->1) before the PWR signal is deasserted (PWR->0), then the 1'bx that is multiplexed back to the input of the state element, DFF 302, and will be clocked into the state element and saved on the next clock edge (since, if RET is not asserted, the clock will not be gated).

It will be appreciated, therefore, that FIG. 1 shows a logical netlist level model 100 of a design that can be used in verification of a DFF-based state retention cell in a physical model or implementation. However, it is a relatively simple unoptimized model 100 in that it represents both state elements. In contrast the models 300, 300' of FIGS. 3-4 represent state retention in functional verification model without directly modeling both storage elements. Thus, use of these novel models 300, 300' during functional verification reduces the state proliferation problem during verification.

Figure 5:
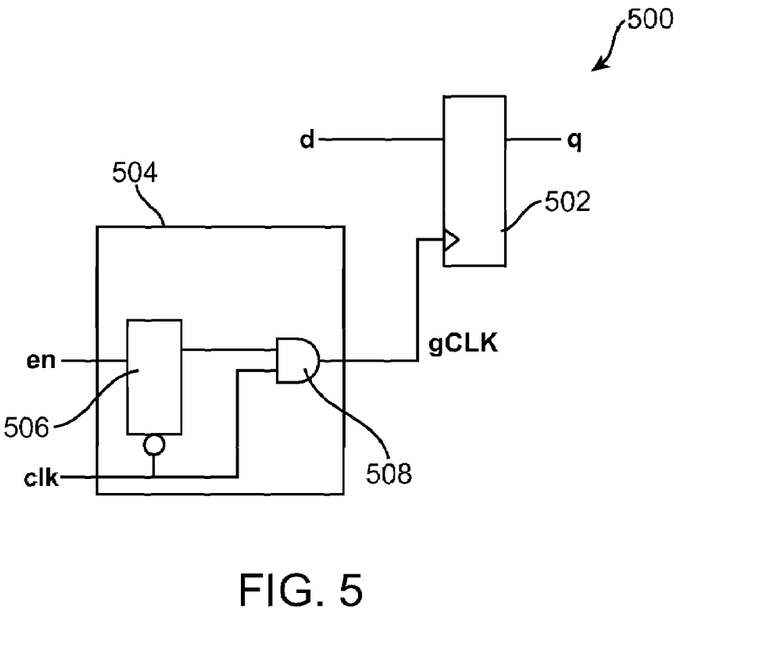
FIG. 5 is an illustrative block diagram of a first state retention element coupled to receive a gated clock signal produced by a clock gating circuit that includes a second state retention element.

FIG. 5 is an illustrative block diagram of a first state retention element 502 coupled to receive a gated clock signal produced by a clock gating circuit 504 that includes a second state retention element 506. In this example, the first state retention element 502 is implemented as an edge triggered DFF. The second state retention element is implemented as a latch circuit. The clock gating circuit 504 includes the latch 506 and an AND logic gate 508. The latch 506 is coupled to receive an enable signal (en) as its data input. The latch 508 receives an inverted value of the clock signal (clk) as its clock input. The data output of the latch and the clock signal are provided as inputs to the AND gate 508. The AND gate 508 outputs a gated clock signal (gClk) to the DFF 502.

Note that there are other kinds of latches and FFs, e.g. JKFFs, and RS latches, that fall under the generic category of latch and FF and can serve as alternative embodiments.

In operation, in the illustrated embodiment, the DFF 502 inputs the data signal (d) upon the occurrence of the gated clock signal (gClk). A rising gated clock signal edge occurs when the clock signal (clk) rises while the latch 506 outputs a value indicating storage of a logic level=1 enable signal (en). If the stored enable signal has a logic level=0 enable signal low, then the clock gated (gClk) signal is blocked, and the output of the AND gate 508 is a logic level=0 value.

More specifically, the latch 506 passes through the value of an enable signal (en) provided on its input line to its output line and to the AND logic gate 508 when the clock signal (clk) is logic level=0. Conversely, the latch circuit 506 provides a saved value for the enable signal (en) to the AND logic gate 508 when clock signal (elk) is logic level=1. As a result, the signal value on the output line of the latch 506 cannot change while the clock signal (clk) is logic level=1. The inclusion of a latch 506 in the clock gating circuitry 508 thereby prevents the occurrence of glitches or race conditions that otherwise might occur if the enable signal (en) could change while the clock signal (clk) was in a logic level=1 state.

Figure 6:
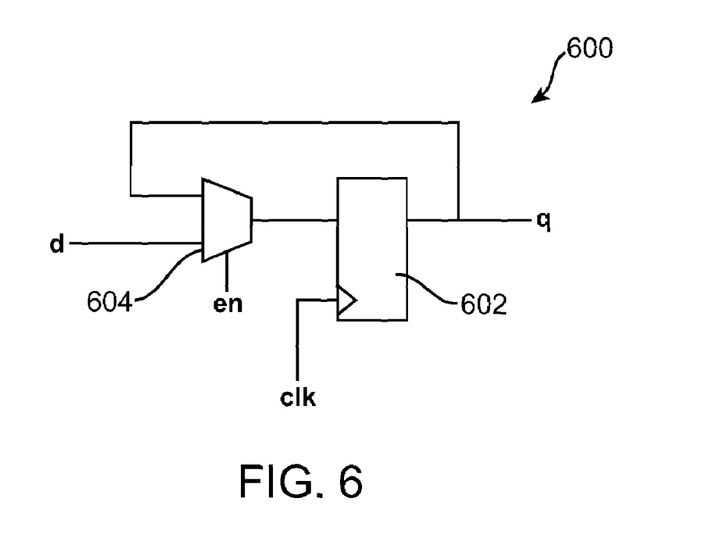
FIG. 6 is an illustrative block diagram of a third verification model representing behavior of the DFF and the clock gating circuit of FIG. 5 used during formal verification in accordance with some embodiments of the invention.

FIG. 6 is an illustrative block diagram of a third verification model 600 representing behavior of the DFF 502 and the clock gating circuit 504 of FIG. 5 used during formal verification in accordance with some embodiments of the invention. The third model 600 includes an edge triggered DFF 602 and a multiplexer 604. An output of the multiplexer 604 is provided to a data input of the DFF 602. An output value (q) of the DFF 602 is fed back to a first input of the multiplexer 604. A second input of the multiplexer 604 receives a data input signal (d). The enable signal (en) controls signal selection by the multiplexer 604. A clock input is provided directly to a clock terminal of the DFF 602 with no gating.

In operation, when the enable signal (en) is logic level=0, the multiplexer 604 selects the fed back signal (q) for provision as an input to the DFF 602. When the enable signal (en) is logic level=1, the multiplexer 604 selects the data signal (d) for provision as an input to the DFF 602. Thus, behavior of the DFF 502 and the clock gating circuit 504 of FIG. 5 is modeled with only a single storage element in FIG. 6.

Figure 7:
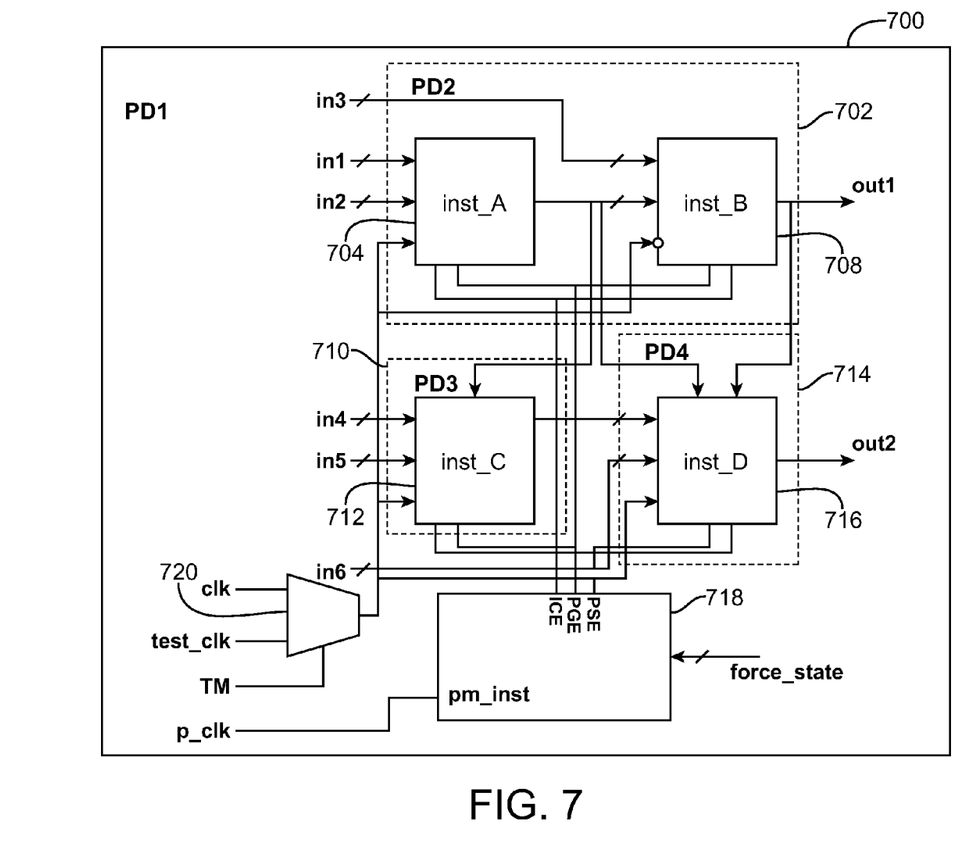
FIG. 7 is an illustrative block diagram representation of a first example integrated circuit design that includes power domains.

FIG. 7 is an illustrative block diagram representation of a first example integrated circuit design that includes power domains. This example top-level design 700 (also referred to as "top design") includes four logic function instances inst_A 704, inst_B 706, inst_C 712, and inst_D 716, a power manager instance pm_inst 718, and a clock gating logic 720. The term "instance" is used to denote a discrete portion of an overall design. An instance may include one or more behaviors, operations or sets of operations at the RTL abstraction level or one or more logic gates or macros at a logic abstraction level. The clock gating logic 720 receives inputs clk and test clk, and a control signal TM. The output of the clock gating logic controls the gating of the clocks to instances inst_A 704, inst_B 706, inst_C 712, and inst_D 716, respectively.

As shown in FIG. 7, the example design includes four power domains. Individual power domains are defined relative to the function instances encompassed by such individual power domains. The "top design" and the power manager instance pm_inst 718 belong to the default power domain PD1 700. Function instances inst_A 704 and inst_B 706 belong to the power domain PD2 702. Function instance inst_C 712 belongs to power domain PD3 710. Function instance inst_D 716 belongs to power domain PD4. Table 3 shows illustrative static behavior of the four domains according of the example design.

TABLE 3

| Power Domain | Power Mode | | | |
| --- | --- | --- | --- | --- |
| | PM1 | PM2 | PM3 | PM4 |
| PD1 | ON | ON | ON | ON |
| PD2 | ON | OFF | OFF | OFF |
| PD3 | ON | ON | OFF | OFF |
| PD4 | ON | ON | ON | OFF |

The power manager instance (pm_inst) 718 generates three sets of power control signals, namely pse_enable, pge_enable, and ice_enable, to control each power domain. Table 4 shows illustrative power control signals of the power manager instance pm_inst 718 for controlling the four power domains of the example design.

TABLE 4

| | Power Control Signals | | |
| --- | --- | --- | --- |
| Power Domain | power switch enable (PSE) | isolation cell enable (ICE) | power gating enable (PGE) |
| PD1 | no control signal | no control signal | no control signal |
| PD2 | pse_enable[0] | ice_enable[0] | pge_enable[0] |
| PD3 | pse_enable[1] | ice_enable[1] | pge_enable[1] |
| PD4 | pse_enable[2] | ice_enable[2] | pge_enable[2] |

The following Table 5 provides an example RTL power-related information file listing for the "top design" of FIG. 7 presented in an illustrative prescribed format, referred to herein as the "common power format" (CPF) in accordance with some embodiments of the invention. The power-related information listing is encoded in computer readable storage that can be accessed by EDA tools involved with simulation, verification, synthesis and/or physical design, for example. The encoding set forth in Table 5 comprises an information structure that corresponds to the power-related design of FIG. 7. The encoding specifies power domains in relation to function instances (i.e. inst_A, inst_B, inst_C and inst_D) from an RTL design specification (not shown). The encoding also specifies power-control related behavior such, as PSO switching, isolation, state retention and always-on, in relation to the specified power domains. Thus, the encoding of Table 5 represents an information structure that specifies what parts of an RTL design fit within what power domains and that also specifies power-control related behavior associated with the different power domains specified by the information structure.

It will be appreciated that a power domain may be specified that includes an instance having a state element. A power information control file may specify that that state instance is to exhibit state retention behavior during power shut off. One example model for such state retention behavior is represented by the model 100 of FIG. 1. However, as explained above, a two state element model 100 can result in a proliferation of states that can have a deleterious impact upon formal verification. Therefore, a verification process in accordance with some embodiments of the invention employ a verification model that has only a single state saving element, such as the models 300, 3000' shown in FIGS. 3-4. Specifically, a verification process according to some embodiments of the invention transforms a logic level gate representing such state saving element to a verification model having a single state saving element such as those of FIGS. 3-4, rather than use a model including multiple state saving elements like that of FIG. 1, for example.

TABLE 5

```
# Define top design
set_top_design top
# Set up logic structure for all power domains
create_power_domain -name PD1 -default
create_power_domain -name PD2 -instances { inst_A inst_B } \
    -shutoff_condition { pm_inst.pse_enable[0] }
    create_power_domain -name PD3 -instances inst_C \
-shutoff_condition { pm_inst.pse_enable[1] }
create_power_domain -name PD4 -instances inst_D \
    -shutoff_condition { pm_inst.pse_enable[2] }
# Define static behavior of all power domains and specify timing
constraints
create_power_mode -name PM1 -sdc_files . . . /SCRIPTS/cm1.sdc \
    -activity_file . . . /SIM/top_1.tcf
create_power_mode -name PM2 -off_domains PD2 -sdc_files
    . . . /SCRIPTS/cm2.sdc
create_power_mode -name PM3 -off_domains { PD2 PD3 }
create_power_mode -name PM4 -off_domains { PD2 PD3 PD4 }
# Set up required isolation and state retention logic of all domains
create_state_retention_logic -restore edge { pm_inst.pge_enable[0] } \
    -instances inst_A.reg_bank_1.out
    create_state_retention_logic -power_domain PD3 -restore edge \
{ pm_inst.pge enable[1] }
create_state_retention_logic -power_domain PD4 -restore_edge \
    { pm_inst.pge_enable [2] }
    create_isolation_logic -from PD2 -isolation_condition \
{ pm_inst.ice_enable[0] } -isolation_output high
create_isolation_logic -from PD3 -isolation_condition \
    { pm_inst.ice_enable [1] }
create_isolation_logic -from PD4 -isolation condition \
    { pm_inst.ice_enable [2] }
```

Figure 8:
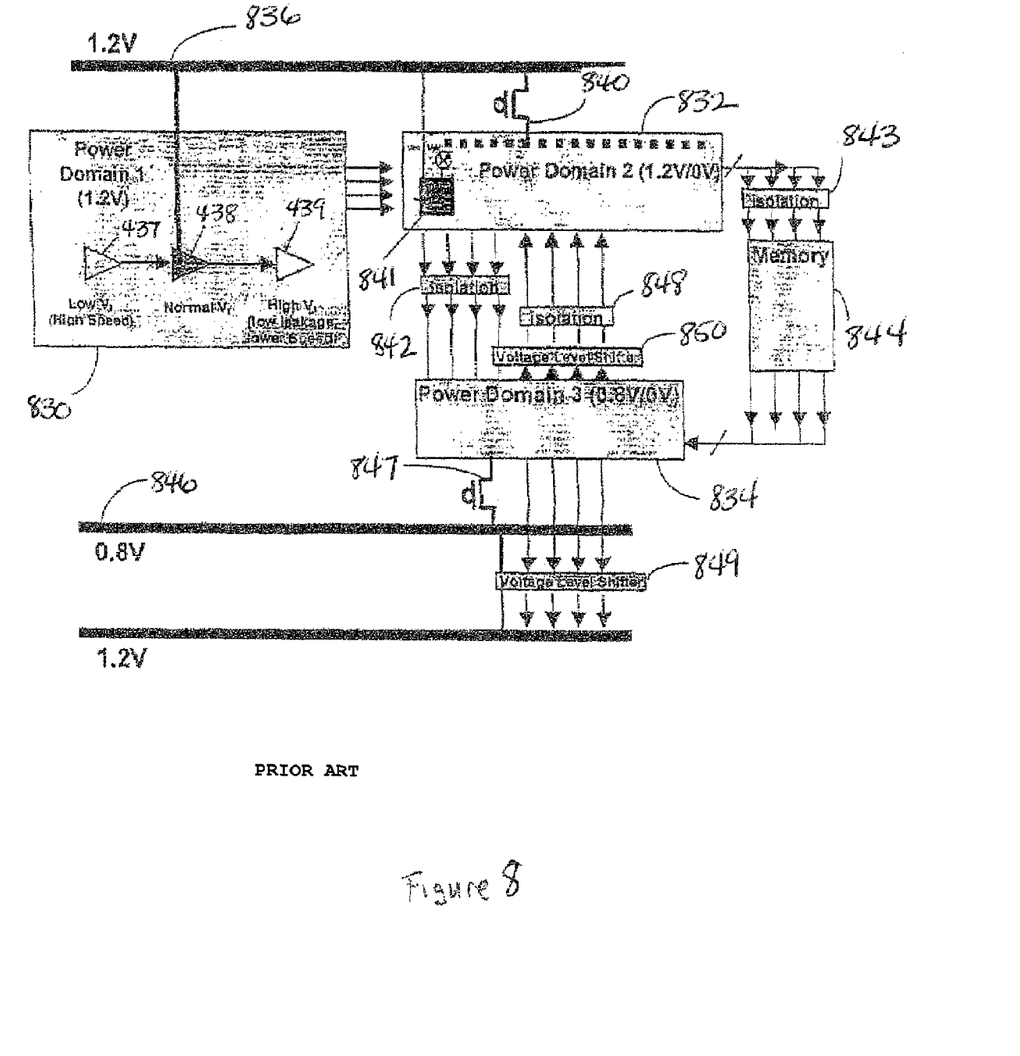
FIG. 8 is an illustrative block diagram representation of a second example design that implements power domains.

FIG. 8 is an illustrative block diagram representation of a second example design that implements power domains. Power-related information incorporated into an RTL power information format can be in is used to track and maintain the power-related design intent, power-related power constraint, and power-related technology information for this design. This second example design shows characteristics of advanced power management techniques which can be specified using an RTL power information format. Three power domains are shown: Power Domain 1 (830), Power Domain 2 (832), and Power Domain 3 (834).

Power Domain 1 (830) includes a collection of logic blocks (i.e. function instances) that use the same power supply during normal operation. In this example, Power Domain 1 operates at 1.2V. Power Domain 1 is coupled to a power rail 836 operating at 1.2V. It is noted that a switch is not used to couple Power Domain 1 to the 1.2V power rail. As a result, Power Domain 1 is always "on," and cannot be turned off.

Power Domain 1 includes three cells (i.e. function instances) having different operating parameters. A first cell 837 is associated with a low Vt, which provides operating characteristics of high speed and high leakage. A second cell 838 is associated with a normal Vt, which provides operating characteristics of normal speed and normal leakage. A third cell 839 is associated with a low Vt, which provides operating characteristics of low speed but also low leakage. Designers will attempt to balance the selection of these combinations of cells to achieve a desired set of performance characteristics with minimum leakage.

Power Domain 2 (832) also includes a set of logic blocks. Power Domain 2 can be powered on or off depending upon the particular power mode that is being employed. Therefore, Power Domain 1 can be at either 1.2V or 0V. In this example, a power gating switch 840 is used to power off or on the power domain.

Power Domain 2 contains a state retention power gating (SRPG) cell 841 to maintain state information during the periods of time in which the power domain is powered down. In accordance with aspects of the present invention, this cell would be transformed to a verification model having a single state saving element such as that of FIG. 3 or FIG. 4 for formal verification. It can be seen that the SRPG cell 841 is separately coupled to the 1.2V power rail so that it can retain state even when the power switch has cut off power generally to the power domain.

Power Domain 2 is associated with appropriate isolation logic to ensure that inadvertent and unintended data is not propagated to other blocks when the power domain is powered down. For example, isolation logic 842 is used to connect Power Domain 2 to Power Domain 3. Similarly, isolation logic 843 is used to connect Power Domain 2 to a memory device 844.

Power Domain 3 (834) is a collection of logic blocks which all operate at 0.8V and the power domain is therefore connected to a power rail 846 at 0.8V. Power Domain 3 can be powered on or off depending upon the particular power mode that is being employed. Therefore, Power Domain 3 can be at either 0.8V or 0V. In this example, a power switch is used to power off or on the power domain.

Power Domain 3 is also associated with appropriate isolation logic 848 to ensure that inadvertent and unintended data is not propagated to other blocks when the power domain is powered down.

Voltage level shifters are used to interact with other blocks that operate at other voltage levels. For example, since Power Domain 2 operates at 1.2V and Power Domain 3 operates at 0.8V, voltage level shifters (849, 850) are used between these two power domains.

Figure 9:
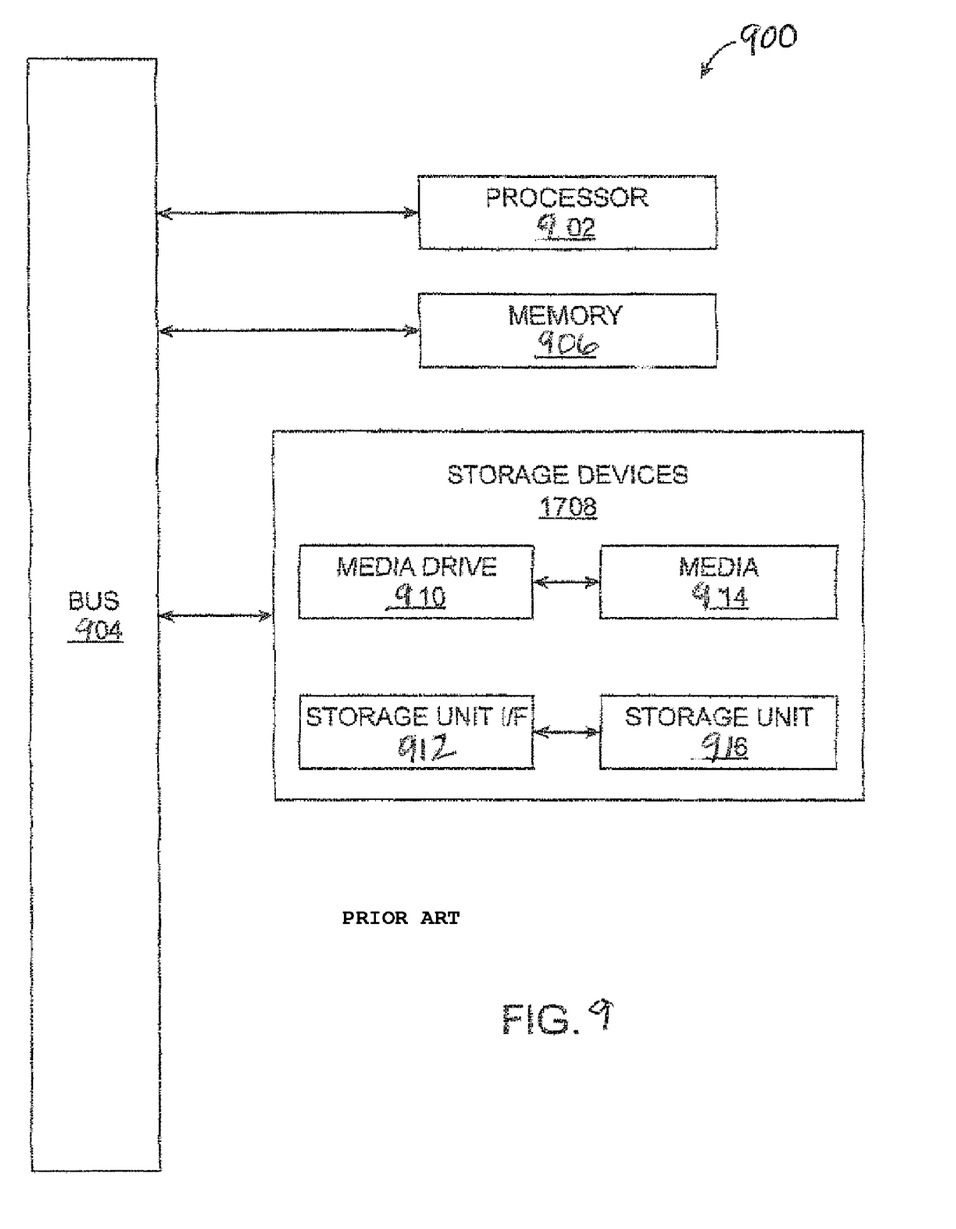
FIG. 9 is a block diagram of an illustrative computing system 900 suitable for implementing some embodiments of the present invention.

FIG. 9 is a block diagram of an illustrative computing system 900 suitable for implementing some embodiments of the present invention. Computer system 900 includes a bus 906 or other communication mechanism for communicating information, which interconnects subsystems and devices, such as processor 907, system memory 908 (e.g., RAM), static storage device 909 (e.g., ROM), disk drive 910 (e.g., magnetic or optical), communication interface (e.g., modem or ethernet card), display 911 (e.g., CRT or LCD), input device 912 (e.g., keyboard), and cursor control.

According to one embodiment of the invention, computer system 900 performs specific operations by processor 907 executing one or more sequences of one or more instructions contained in system memory 908. Operations may include creating a model of a single edge triggered state saving element in a computer readable medium and creating associated computer readable gate logic expressions that cause suspending saving of new states by the single state saving element during verification upon the occurrence of a first state retention signal in preparation for verification of a power shut off condition. Operations also may include creating in the medium selection logic expressions that cause selection of signals associated with the single edge triggered state saving element in response to power control related signals during verification. Such instructions may be read into system memory 908 from another computer readable/usable medium, such as static storage device 909 or disk drive 910. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing an for storing an information structure or for providing an information structure or instructions to processor 907 for execution. Such a medium may take many forms, including but not limited to, non-volatile media, volatile media, and transmission media. Non-volatile media includes, for example, optical or magnetic disks, such as disk drive 910. Volatile media includes dynamic memory, such as system memory 908. Transmission media includes coaxial cables, copper wire, and fiber optics, including wires that comprise bus 906. Transmission media can also take the form of acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In an embodiment of the invention, execution of a sequences of instructions to is performed by a single computer system 900. According to other embodiments of the invention, two or more computer systems 900 coupled by communication link 915 (e.g., LAN, PTSN, or wireless network) may perform the sequence of instructions required to practice the invention in coordination with one another.

Computer system 900 may transmit and receive messages, data, and instructions, including program, i.e., application code, through communication link 915 and communication interface. Received program code may be executed by processor 907 as it is received, and/or stored in disk drive 910, or other non-volatile storage for later execution.

The foregoing description and drawings of preferred embodiments in accordance with the present invention are merely illustrative of the principles of the invention. Various modifications can be made to the embodiments by those skilled in the art without departing from the spirit and scope of the invention, which is defined in the appended claims.

The invention claimed is:

1. An integrated circuit design method for use with a circuit design that saves logical state during power shut off operation, wherein the circuit design includes state saving circuitry that has static retention behavior during power shut off operation circuit, wherein the state saving circuit includes:
   a first second state retention element that is powered off during power off operation of the state saving circuit;
   a second state retention element that is powered on during power off operation of the state saving circuit; and
   multiplex circuitry;
   wherein the first and second state retention elements and the multiplex circuitry are operatively coupled to cause, the first state retention element to save state during normal power on operation of the state saving circuit, and the second state retention element to save state of the first state retention element during power shut off operation of the state saving circuit, the method comprising:

using a computer system to create in a storage device a model of the state saving circuit that includes a single edge triggered state saving element to correspond to the first and second state saving elements;

creating in the storage device clock gate logic that suspends saving of new states by the single state saving element upon occurrence of a first state retention signal value in preparation for power shut off;

providing in the storage device an indeterminate value signal having a value indicative of an unreliable saved state;

creating in the storage device second selection logic responsive to a power control signal to provide an output selected between data output of the single state saving element and the provided indeterminate signal value; and creating in the storage device first selection logic responsive to the power control signal to select between the output of the second selection logic and a data signal and to provide the selected signal to a data input of the state saving element.

2. The method of claim 1, wherein the clock gate logic causes resuming of saving of new states by the single state saving element upon occurrence of a second state retention signal value following power shut off.

3. The method of claim 1 further comprising:

automatically transforming the design, which is expressed in a hardware description language to a logical netlist; and obtaining power control information for the circuit design that specifies static state retention behavior associated with at least one state saving element of the design during power shut off.

4. The method of claim 1, wherein the clock gate logic causes resuming of saving of new states by the single state saving element upon occurrence of a second state retention signal value following power shut off;

wherein the single edge triggered state saving element includes a set terminal and a reset terminal; further including:

set control logic to permit a set operation upon the single state saving element only during power up during occurrence of a second state retention signal value; and reset control logic to permit a reset operation upon the single state saving element only during power up during occurrence of a second state retention signal value.

5. An article of manufacture that includes a computer data storage device, encoded with code structure, when executed by a computer causes the computer data device to implement a method, for use with a circuit design that saves logical state during power shut off operation, wherein the circuit design includes state saving circuitry that has static retention behavior power shut off operation circuit, wherein the state saving circuit includes:

a first second state retention element that is powered off during power off operation of the state saving circuit;

a second state retention element that is powered on during power off operation of the state saving circuit; and multiplex circuitry;

wherein the first and second state retention elements and the multiplex circuitry are operatively coupled to cause, the first state retention element to save state during normal power on operation of the state saving circuit, and the second state retention element to save state of the first state retention element during power shut off operation of the state saving circuit, the method comprising:

using a computer system to create in device storage a model of the state saving circuit that includes a single edge triggered state saving element to correspond to the first and second state saving elements; creating in the storage device clock gate logic that suspends saving of new states by the single state saving element upon occurrence of a first state retention signal value in preparation for power shut off;

providing in the device storage an indeterminate value signal having a value indicative of an unreliable saved state;

creating in the device storage second selection logic responsive to a power control signal to provide an output selected between data output of the single state saving element and the provided indeterminate signal value; and creating in the device storage first selection logic responsive to the power control signal to select between the output of the second selection logic and a data signal and to provide the selected signal to a data input of the state saving element.

6. The article of claim 5, wherein the clock gate logic causes resuming of saving of new states by the single state saving element upon occurrence of a second state retention signal value following power shut off.

7. An integrated circuit design method for use with a circuit that includes a first state retention element coupled to receive a gated clock signal from gated clock circuitry that includes a second state retention element coupled to receive a clock enable value as a data input, the method comprising:

using a computer system to create in a storage device a model of the circuit that includes a single edge triggered state saving element to correspond to the first and second state saving elements; and creating in the device storage, selection logic having a control terminal coupled to receive the clock enable value and to select between an output data value provided by the first storage element and an input data input value provided to the first storage element.

8. An article of manufacture that includes a computer data storage device, encoded with code structure, when executed by a computer causes the computer data device to implement a method, for use with a circuit design that includes a first state retention element coupled to receive a gated clock signal from gated clock circuitry that includes a second state retention element coupled to receive a clock enable value as a data input, the method comprising:

using a computer system to create in a storage device a model of the circuit that includes a single edge triggered state saving element to correspond to the first and second state saving elements; and creating in the device storage, selection logic having a control terminal coupled to receive the clock enable value and to select between an output data value provided by the first storage element and an input data input value provided to the first storage element.

* * * * *